United States Patent [19]
Kalker, Jr. et al.

[11] Patent Number: 5,732,524
[45] Date of Patent: Mar. 31, 1998

[54] TRUSS ANCHOR

[75] Inventors: William J. Kalker, Jr., Monroe, Conn.; William C. Masters, Lakeland, Fla.

[73] Assignee: Building Technologies, Inc., Bartow, Fla.

[21] Appl. No.: 635,414

[22] Filed: Apr. 26, 1996

[51] Int. Cl.⁶ ..................................................... E04B 1/38
[52] U.S. Cl. ..................... 52/712; 52/92.2; 52/745.21; 403/232.1; 403/400
[58] Field of Search .................. 52/712–715, 745.21, 52/702, 691, 92.1; 403/232.1, 400

[56] References Cited

U.S. PATENT DOCUMENTS

| | | |
|---|---|---|
| 631,352 | 8/1899 | Wilding . |
| 2,016,702 | 10/1935 | Bauer ............................ 20/92 |
| 2,477,163 | 7/1949 | Barnett .......................... 20/94 |
| 2,611,160 | 9/1952 | Hanessee ...................... 20/92 |
| 2,911,690 | 11/1959 | Sanford .................... 403/232.1 |
| 3,000,145 | 9/1961 | Fine ............................ 50/466 |
| 3,359,701 | 12/1967 | Schneller ..................... 52/712 |
| 4,455,805 | 6/1984 | Rionda et al. ............... 52/712 |
| 4,498,801 | 2/1985 | Gilb ........................ 403/232.1 |
| 4,555,887 | 12/1985 | Rinoda et al. ......... 403/232.1 X |
| 4,572,375 | 2/1986 | Braginetz ..................... 52/712 |
| 4,594,017 | 6/1986 | Hills ............................ 403/6 |
| 4,893,961 | 1/1990 | O'Sullivan et al. ........ 403/232.1 |
| 4,896,985 | 1/1990 | Commins ................ 403/232.1 X |
| 4,932,173 | 6/1990 | Commins ...................... 52/92 |
| 5,042,217 | 8/1991 | Bugbee et al. ................ 52/643 |
| 5,150,553 | 9/1992 | Commins et al. .......... 52/713 X |
| 5,230,198 | 7/1993 | Callies ......................... 52/702 |
| 5,236,273 | 8/1993 | Gilb ........................ 403/232.1 |
| 5,240,342 | 8/1993 | Kresa, Jr. ................. 403/232.1 |
| 5,335,469 | 8/1994 | Stuart ....................... 52/713 X |
| 5,448,871 | 9/1995 | Newman et al. ........... 52/702 X |

FOREIGN PATENT DOCUMENTS

2228955   9/1990   United Kingdom ................ 52/702 X

*Primary Examiner*—Michael Safavi
*Assistant Examiner*—Winnie S. Yip
*Attorney, Agent, or Firm*—Maguire, Voorhis & Wells, P.A.; Robert L. Wolter

[57] ABSTRACT

The present invention is a truss anchor for attaching a truss to a wall system of a building frame. The truss anchor is a single piece of metal having a lower plate member and an upper plate member. The lower plate member has a first plate section defining an area of attachment to a vertically disposed surface of the truss. A lower extension is integral this first plate section and extends lateral the truss. An upper extension is integral the lower extension and extends upward therefrom adjacent the truss. The upper plate member forms a strap and includes a first strap section integral the upper extension and substantially perpendicular the lower plate member. A second strap section, integral the first strap section, extends laterally over the lower plate member and a third strap section, integral the second strap section, extends downward parallel the first plate section of the lower plate member. The invention also includes means for securing the lower plate member to the wall system and the upper plate member to the truss.

15 Claims, 2 Drawing Sheets

TRUSS ANCHOR

FIELD OF THE INVENTION

This invention relates generally to the field of hardware assemblies or devices used in fastening and/or coupling wooden frame members. More specifically, this invention involves those hardware pieces used to fasten or secure wooden truss members to a wall system.

BACKGROUND OF THE INVENTION

In the construction of wooden frames for buildings, coupling and/or fastening devices are often used to join, or secure together, different frame members. One such junction includes securing a truss assembly to a wall framing or system. The truss assembly usually consists of a horizontal member attached to an inclined member, and this assembly is mounted to the wall system. Additionally, the inclined member may be attached directly to the wall system. In either case, the security of the truss to the wall system may be compromised as a result of the attachment of the inclined member to the truss or wall system. This attachment creates an awkward angle for nailing the incline to the truss assembly and/or to the wall system. Anchors or couplings may be used to secure the trusses to the wall systems. These anchors must be durable enough to support heavy loads, but simple in construction for easy, on-the-job installation. There is also a need for such an anchor that is relatively inexpensive and still meets the previously mentioned structural demands.

U.S. Pat. No. 5,230,198 issued to Callies discloses the use of a variable pitch connector having a base mounted directly to a wall system and a cradle for receiving the inclined member of a truss. The cradle is mounted to each side of the truss extending in a vertical plane.

U.S. Pat. No. 4,932,173 issued to Commins is a truss clip having a base mounted to the wall system, a sail member mounted to the inclined truss member and a flange that depends from the sail member and is secured to a vertical surface of the wall system.

An invention for a bracket for joining a deck member and a supporting beam together, is disclosed in U.S. Pat. No. 4,572,375 issued to Braginetz. This bracket includes a plate that transversely spans the deck member and arms that straddle the beam.

The invention issued to Fine, U.S. Pat. No. 3,000,145 is for a truss anchor employed for rigidly anchoring trusses and joists in a concrete foundation wall. The Fine truss anchor includes a channel member for receiving a truss. A strap has a lower L-shaped portion embedded in the concrete and an upper portion bent over a truss member. The strap extends through a slit in the channel member.

U.S. Pat. No. 4,594,017 issued to Hills discloses a joist hanger having a unitary blank and a hanger for connecting a wooden joist to a header beam. The device has an elongated strap extending from a stirrup for receiving a header beam. The strap is folded over a beam and nailed thereon.

SUMMARY OF THE INVENTION

In view of the foregoing it is an object of the present invention to provide a truss anchor that is simple and inexpensive to manufacture. Another object of the invention is to provide such an anchor that is also easy to install during construction.

It is another object of this invention to provide an anchor that is constructed of a single piece of material with a minimum number of points of attachment of the anchor to the wall system frame. Still another object of this invention is to provide such a truss anchor that is capable of bearing heavy loads applied to the building frame.

These and other objectives are achieved by the present invention for a truss anchor that includes a single planar member stamped from a piece of metal. This planar member includes an upper plate folded to form a strap or clasp for receiving the truss member and a lower plate member for attachment to a vertical surface of the wall system underneath the truss member. A lower plate member has a section that is affixed to the wall system with conventional securing means such as nails, staples or wood screws. The lower plate member also has a side extension that extends laterally of the truss and for attachment of the strap to the lower plate member. The strap or clasp has three sections abutting the truss member. The first strap section is integral the side extension of the lower plate member and is substantially perpendicular to the lower plate member. The second strap section extends lateral the first strap section above the lower plate member and traverses the top of the truss. The third strap section is integral the second strap section extends downward parallel the first section.

DETAILED DESCRIPTION OF THE INVENTION

Figure 1:
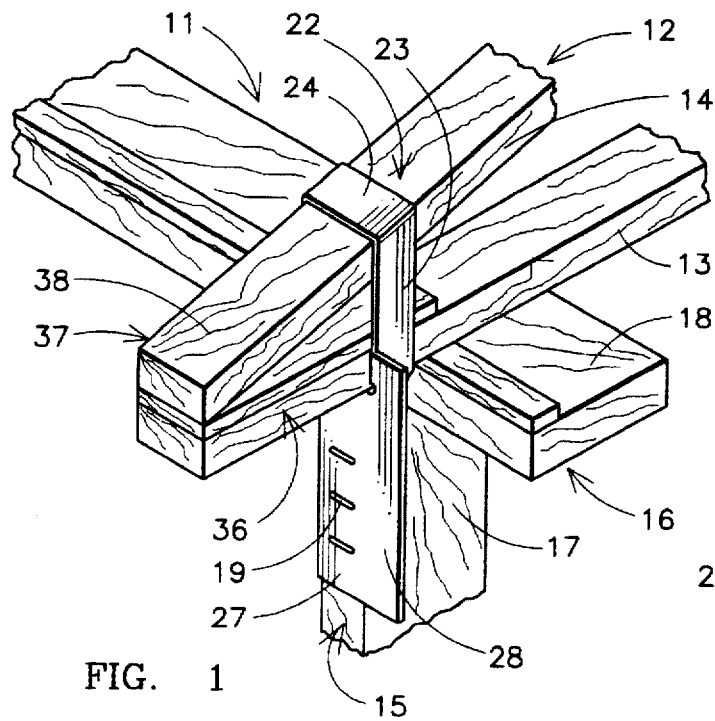
FIG. 1 is a perspective view of the truss anchor on a wall and truss frame.
Figures 2, 3:
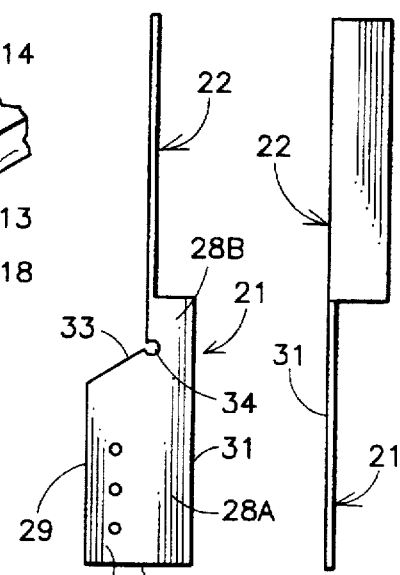
FIG. 2 is a front-elevational view of the truss anchor.
FIG. 3 is a side-elevational view of the truss anchor.

The invention, truss anchor 11, as shown in FIG. 1, may be used to secure a truss 12 to a wall system 16 in construction of buildings. Trusses 12 usually consist of a horizontal member 13 with an inclined member 14 to form the frame for a building roof. Wall systems 16 generally consist of vertical stud members 17 extending intermediate lower and upper horizontal studs 18. The wall system and studs 17 and 18 define a vertically disposed surface 15. The truss has two parallel side surfaces 36 and 37 perpendicular the vertically disposed surface 15 of the wall system 16, and a top surface 38 on the inclined member 14 intermediate the side surfaces 36 and 37. The truss 12 is secured to the wall system 16 over the vertical stud member 17, and the truss anchor 11 is secured to the planar surfaces 15, 36 and 37 of the construction members of the truss 12 and wall system 16 by construction nails, staples or wood screws 19.

Figures 4A, 4B, 4C, 4D:
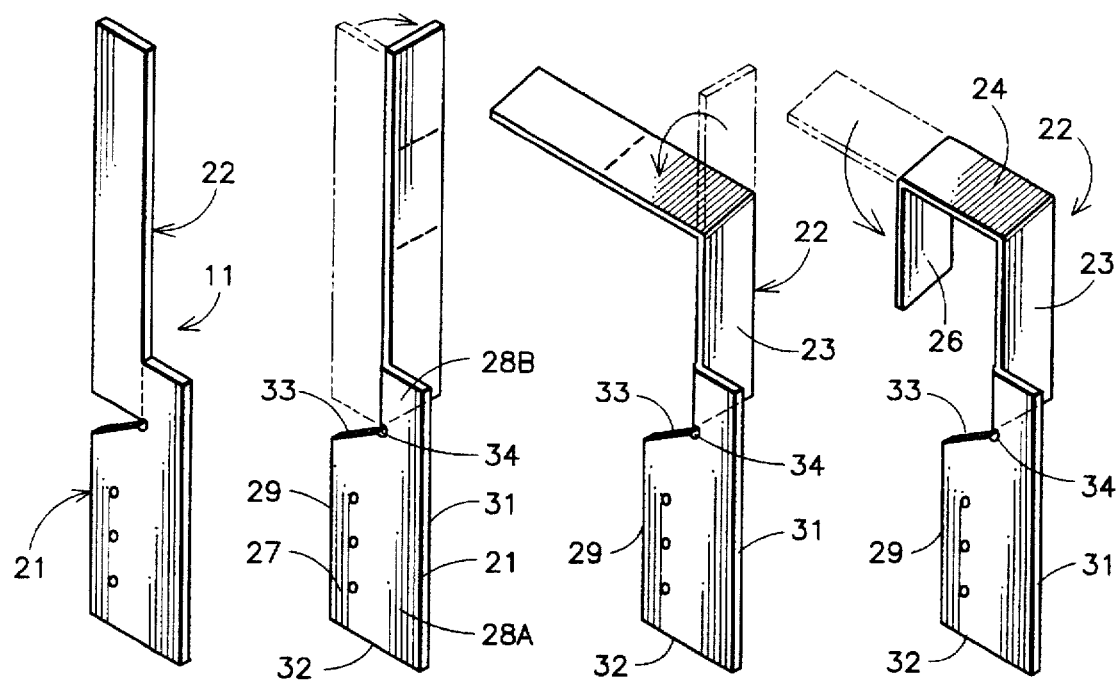
FIG. 4A through 4D is a perspective view of the truss anchor with the strap folded.
Figure 6:
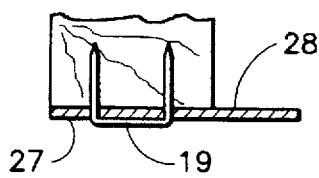
FIG. 6 is a sectional view taken along 6—6 in FIG. 5.
Figure 8:
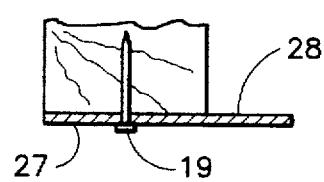
FIG. 8 is a sectional view taken along line 8—8 of FIG. 7.

The truss anchor 11 is a stamped form manufactured with conventional stamping molds, and is preferably fabricated from a metal as steel. As shown in FIG. 4A, the anchor 11 consists of a lower plate member 21 and an upper plate member folded that forms a clasp or strap 22. The strap 22 is folded into to three section 23, 24 and 26 forming a channel above the lower plate member for receiving the truss.

Figure 5:
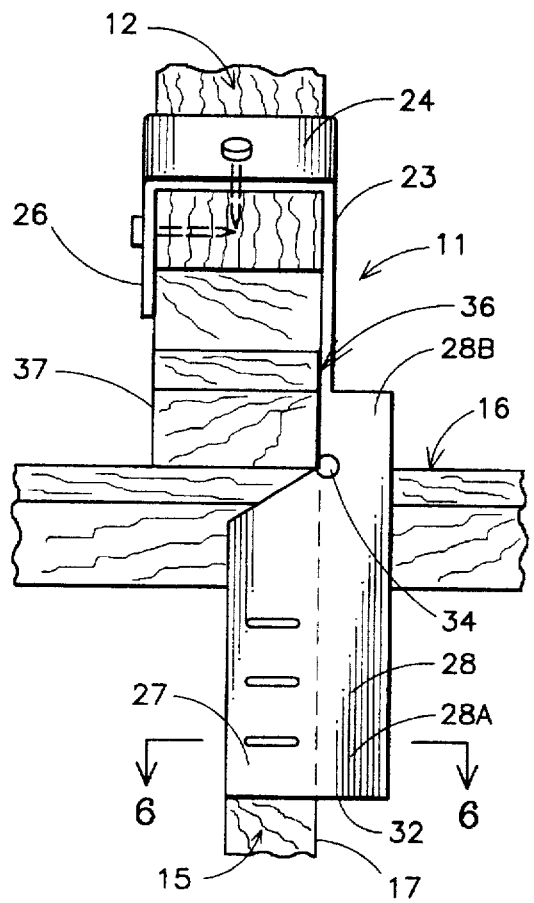
FIG. 5 is a front-elevational view of the truss anchor.
Figure 7:
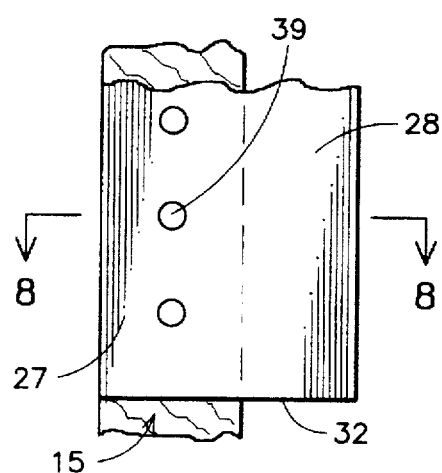
FIG. 7 is a front-elevational view of the lower planar member of the anchor attached to a wall system.

As illustrated in FIGS. 1 and 5, the lower plate member 21 has a first plate section 27 that abuts, and is attached to, the vertical stud 18. This first plate section 21 of the lower plate member 21 defines an area of attachment of the truss anchor to wall system 16 below the truss. The first section 27 is mounted on the vertically disposed surface 15 of the wall system 16 and has a horizontal dimension that extends to a side 36 or 37 of the truss 12.

The lower plate member 21 also has an extension 28 that defines an excess dimension extending laterally of the side of the truss. The extension 28 consists of lower extension 28A and upper extension 28B. The lower extension 28A is integral and coplanar with the first plate section 27. The upper extension 28B is integral the lower extension 28A and extends upward adjacent the truss 12.

The lower plate member 21 has two parallel vertical edges 29 and 31 and a bottom horizontal edge 32. Vertical edge 29 extends upward from the horizontal edge 32 and terminates at a point about three quarters of the height of the parallel vertical edge 31, or at a point below the truss 12. A diagonal edge 33 extends upward at an angle of approximately thirty degrees from the vertical edge 29 towards the opposite edge 31. A stress pocket 34 is formed at the end of diagonal edge 33 at the junction of the first plate section 27, lower extension 28A, upper extension 28B and strap 22.

The strap or clasp 22 is connected to the lower plate member 21 at the upper extension 28B. As shown in FIG. 4A, when the anchor 11 is stamped from its mold the strap 22 is a planar member that has a width substantially equivalent the width of the first plate section 27 of the lower plate member 21, and is coplanar with the lower plate member 21. As shown in FIGS. 4B, the strap 22 is then folded at an angle substantially perpendicular the lower plate member 21. As further illustrated in FIGS. 4C and 4D, the strap is then folded over twice forming the strap sections 23, 24 and 26.

Strap section 23 is integral the upper extension 28B, and substantially perpendicular the lower planar member 21. Strap section 24 extends laterally from the first strap section 23 above the section 27 of the lower planar member 21. Strap section 26 depends from the second strap section 24 substantially parallel the first strap section 23.

The FIGS. 1 and 5 illustrate the truss anchor 11 secures a truss 12 to a wall system 16. The plate section 27 of the lower plate member 21 abuts the vertical stud 18 and is mounted thereon by nails, staples or screws 19. The extension 28B extends upward from extension 28A adjacent the truss 12. Strap sections 23, 24 and 26 each abut a corresponding surface of the truss. Strap section 23 abuts surface 36, strap section 24 traverses the truss 12 and abuts the incline surface 38 and strap section 26 abuts the side surface 37.

Strap 26 is secured to the truss 12 by a nail, staple or wood screw 19. Strap section 24 may be similarly secured against the truss 12 to further stabilize the attachment of the truss anchor 11 to the truss 12 and wall system 16. The stress pocket 34 and excess dimension of the extensions 28A and 28B distribute the load forces applied to the anchor 11 that may result from high winds or natural contraction and expansion of the building frame members.

In the manufacture of the anchor, the upper plate member or strap 22, as part of the manufacturing process, the strap 22 is bent substantially perpendicular to the lower plate member. The strap, however is not folded to fit the truss 12 until the anchor is mounted on the building frame. That is, the strap is actually adapted on the job site. The stamped metal form is flexible enough to bend on the job using a hammer or other tool to force the strap to fit the type of truss.

After the strap 22 is bent or folded to fit the truss 12, nails or staples are driven through the anchor to secure the anchor on the building frame. The anchor 11 is preferably equipped with apertures 39 through which nails or construction staple inserted.

Figure 9:
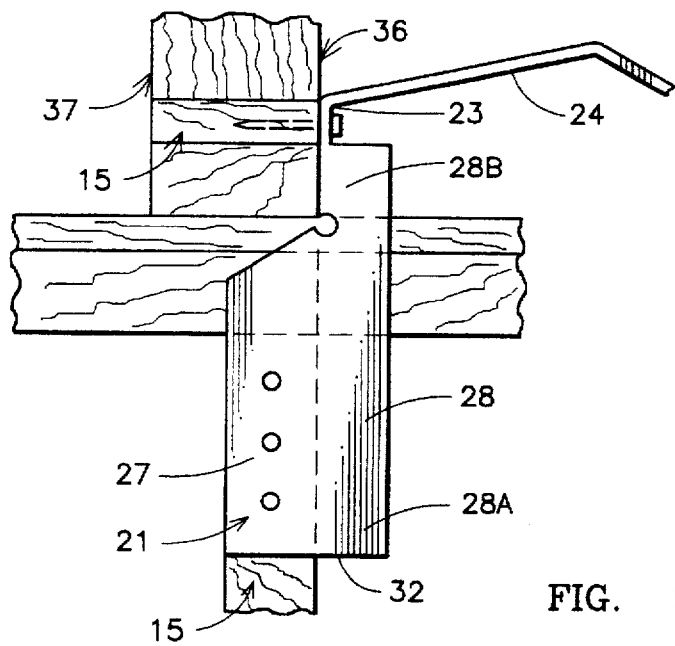
FIG. 9 is a front-elevational view of the invention secured to a first surface of the truss.

In order for the truss anchor to secure the truss 12 to the wall system, the first strap section only may be affixed to the corresponding surface of the truss. The lower plate member 21 is similarly affixed to the wall system underneath the truss. In this instance, the upper plate member may be folded away from the truss as shown in FIG. 9, and the first strap section is affixed to surface of the truss.

While we have disclosed the preferred embodiment of our invention, it is not intended that this description in any way limits the invention, but rather this invention should be limited only by a reasonable interpretation of the new recited claims.

Having thus described our invention, what we claim as new and desire to secure by Letters Patent is:

1. A truss anchor securing a truss to a wall system, said truss anchor, comprising:
    (a) a lower plate member having a first plate section that is positioned underneath the truss and affixed to the wall system underneath the truss, and an extension integral the first plate section extending lateral of a first side of the truss, that extension having a side upwardly adjacent said first side of the truss;
    (b) means for affixing said lower plate member to the wall system underneath the truss;
    (c) an upper plate member attached to the side of the extension of said lower plate member and disposed in a plane substantially perpendicular the lower plate member; and
    (d) means for affixing said upper plate member to the truss.

2. A truss anchor as defined in claim 1 wherein said upper plate member includes a first strap section integral the extension of the lower plate member and perpendicular therewith, extending upward and affixed to the truss.

3. A truss anchor, as defined in claim 2, where said upper plate further includes a second strap section integral the first strap section extending laterally thereof over the lower plate member, and a third strap section integral said second strap section extending downward therefrom parallel said first strap section.

4. A truss anchor as defined in claim 3 wherein said lower plate member includes a first vertical edge, a second vertical edge parallel said first vertical edge, and a bottom horizontal edge intermediate the first and second vertical edges, with said second vertical edge extending upward from the bottom horizontal edge to a point below a given height of first edge, and an inclined edge extending from a top of the second vertical edge upward towards said first vertical edge, and terminating at said side of said extension.

5. A truss anchor securing a truss to a wall system, said truss anchor, comprising:
    (a) a lower plate member having a first plate section positioned underneath the truss and affixed to the wall system underneath the truss, and an extension integral the first plate section extending lateral the truss, said lower plate member includes a first vertical edge, a second vertical edge parallel said first edge, and a bottom horizontal edge intermediate the first and second vertical edges, with said second vertical edge extending upward from the bottom horizontal edge to a point below a height of said first vertical edge, and an inclined edge extending from said second vertical edge upward towards said first vertical edge and terminating at said extension;

(b) means for affixing said lower plate member to the wall system underneath the truss;

(c) an upper plate member attached to the extension of said lower plate member and disposed in a plane substantially perpendicular the lower plate member, said upper plate member includes a first strap section integral the lower plate member and perpendicular therewith extending upward and affixed to the truss and a second strap section integral the first strap section extending laterally thereof over the lower plate member, and a third strap section integral said second strap section extending downward therefrom parallel said first strap section;

(d) means for affixing said upper plate member to the truss; and (e) a stress pocket formed in said lower plate member intermediate the first plate section and the extension of said lower plate member and at a terminus of said inclined edge.

6. A truss anchor, secured to a truss and a wall system having a vertically disposed surface underneath the truss, said truss anchor, comprising:

(a) a lower plate member positioned underneath the truss and affixed to the vertically disposed surface of the wall system underneath the truss, said lower plate member having a first plate section affixed to the wall system underneath the truss and a lateral extension attached to the first plate section extending laterally of a first side of the truss and the extension having a side extending upwardly adjacent the first side of the truss; and (b) an upper plate member affixed to the truss, said upper plate member attached to the side of the lateral extension of the lower plate member, said upper plate member disposed in a plane perpendicular to said lower plate member and folded or bent to form a strap above the lower plate member.

7. A truss anchor as defined in claim 6 wherein said upper plate member includes a first strap section attached to the lower plate member, extending upward therefrom, abutting a vertical surface of the truss, a second strap section integral said first strap section abutting a top surface of the truss and a third strap section parallel said first section abutting a corresponding vertical surface of the truss.

8. A truss anchor as defined in claim 7 wherein said lateral extension of the lower plate member includes a lower extension integral the first plate section of the lower plate member and an upper extension integral the lower extension, said upper extension extending upward adjacent the truss and connected to the first strap section of the strap.

9. A truss anchor, secured to a truss and a wall system having a vertically disposed surface underneath the truss, said truss anchor, comprising:

(a) a lower plate member affixed to the vertically disposed surface of the wall system underneath the truss, said lower plate member includes a first section positioned underneath the truss and affixed to the wall system underneath the truss and a second section integral said first section of the lower plate member, said second section of the lower plate member includes a lower extension integral the first section of the lower plate member and an upper extension integral the lower extension extending upward adjacent the truss; and (b) the lower plate member includes a bottom horizontal edge, a first vertical edge extending upward therefrom lateral of the truss, a second vertical edge parallel the first vertical edge terminating at a point below the truss, an inclined edge extending upward the second vertical edge towards the first vertical edge and terminating at a stress pocket formed in the lower plate member at the junction in the first plate section, lower extension and upon extension of the lower plate member;

(c) an upper plate member affixed to the truss, said upper plate member attached to said lower plate member, said upper plate member disposed in a plane perpendicular to said lower plate member and folded or bent to form a strap, the upper plate member includes a first plate section attached to the lower plate member, extending upward therefrom, abutting a vertical surface of the truss, a second plate section integral said first section abutting a top surface of the truss and a third plate section parallel said first plate section abutting a corresponding vertical surface of the truss.

10. A truss anchor, secured to a truss and a wall system, said truss anchor; comprising:

(a) a lower plate member and said lower plate member is affixed to the wall system at an area underneath the truss and said lower plate member having a lateral extension extending lateral of a first side of the truss and upward adjacent a first side of the truss; and (b) a strap having a first strap section attached to the extension of said lower plate member and disposed substantially perpendicular to the lower plate member, and extending upward therefrom, a second strap section integral the first strap section extending laterally therefrom above that area of attachment of the lower plate member to the wall system underneath the truss and a third strap section integral the second strap section extending downward therefrom substantially parallel the first strap section.

11. A truss anchor, secured to a truss and a wall system, said truss anchor; comprising:

(a) a lower plate member having a first plate section positioned underneath the truss and affixed to the wall system underneath the truss and an extension integral the first plate section, said extension having a lower extension extending laterally of the truss and upward to a bottom of the truss and an upper extension integral the lower extension extending upward therefrom adjacent the truss;

(b) said lower plate member including a bottom horizontal edge, a first vertical edge extending upward from a bottom horizontal edge defining an edge of the upper and lower extensions, and a second vertical edge parallel and spaced apart from said first vertical edge and extending upward from the bottom horizontal edge to a point below the truss, an inclined edge extending from the second vertical edge towards the first vertical edge terminating at a stress pocket formed in the lower plate member at the junction of the first plate section, the lower extension and the upper extension of the lower plate member; and, (c) a strap having a first strap section attached to said lower plate member and disposed substantially perpendicular the lower plate member, and extending upward therefrom, a second strap section integral the first strap section extending laterally therefrom above an area of attachment of the lower plate member and a third strap section integral the second strap section extending downward therefrom substantially parallel the first strap section.

12. A method for securing a truss to a wall system comprising the steps of:

(a) overlying a truss on a wall system such that said wall system has a vertically disposed surface and said truss has a first vertical side surface and a second vertical side surface, parallel one another and perpendicular to the vertically disposed surface of the wall system and a top surface intermediate the first and second vertical side surface of the truss;

(b) abutting a truss anchor to said truss and wall system whereby said truss anchor has a lower plate member abutting the vertically disposed surface of the wall system underneath the truss and an upper plate member disposed in a plane substantially perpendicular to the lower plate member and abutting at least one surface of the truss, and said lower plate member has a lateral extension that extends lateral of the first vertical side surface and upwardly adjacent to abut the first vertical side surface of the truss and said upper plate member is attached to the lateral extension of the lower plate member; and (c) affixing said lower plate member to the wall system underneath the truss and the upper plate member to the truss.

13. A method for securing a truss to a wall system as defined in claim 12 wherein said abutting step includes the step of bending the upper plate member over the truss to form a strap having a first strap section attached to the lower plate member, said first strap section abutting the first surface of the truss, a second strap section integral the first section of the truss extending over the lower plate member and abutting the top surface of the truss, and a third strap section integral the second strap section extending downward therefrom and abutting the corresponding second side surface of the truss.

14. A method for securing a truss to a wall system as defined in claim 13 wherein said affixing step includes affixing the third strap section of the upper plate member to a corresponding surface of the truss.

15. A method for securing a truss to a wall system as defined in claim 14 wherein said affixing step includes the step of affixing the second strap section to the top surface of the truss.

\* \* \* \* \*